Figure 1:
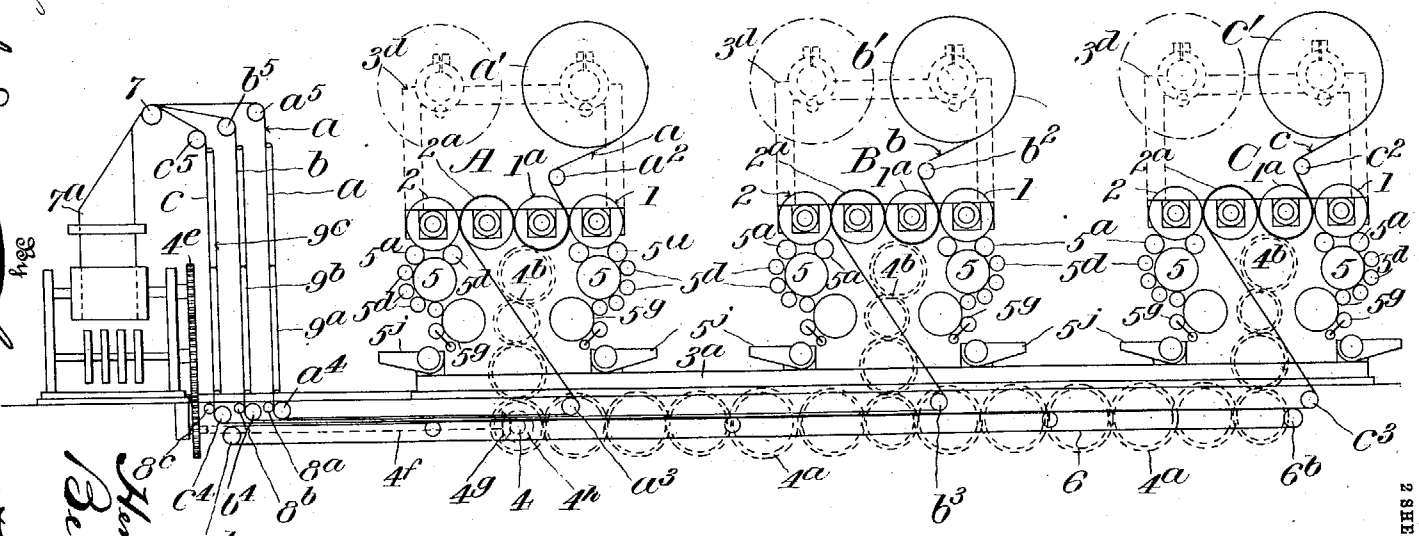

H. F. BECHMAN.

ROTARY PRINTING PRESS.

Reissued Nov. 11, 1913. 13,641.

APPLICATION FILED OCT. 13, 1913.

2 SHEETS—SHEET 1.

Witnesses

C. H. Walker

James R. Mansfield.

Inventor

Henry F. Bechman.

By Alexander Lowell

Attorneys

H. F. BECHMAN.
ROTARY PRINTING PRESS.
Reissued Nov. 11, 1913. 13,641.
APPLICATION FILED OCT. 13, 1913.
2 SHEETS—SHEET 2.
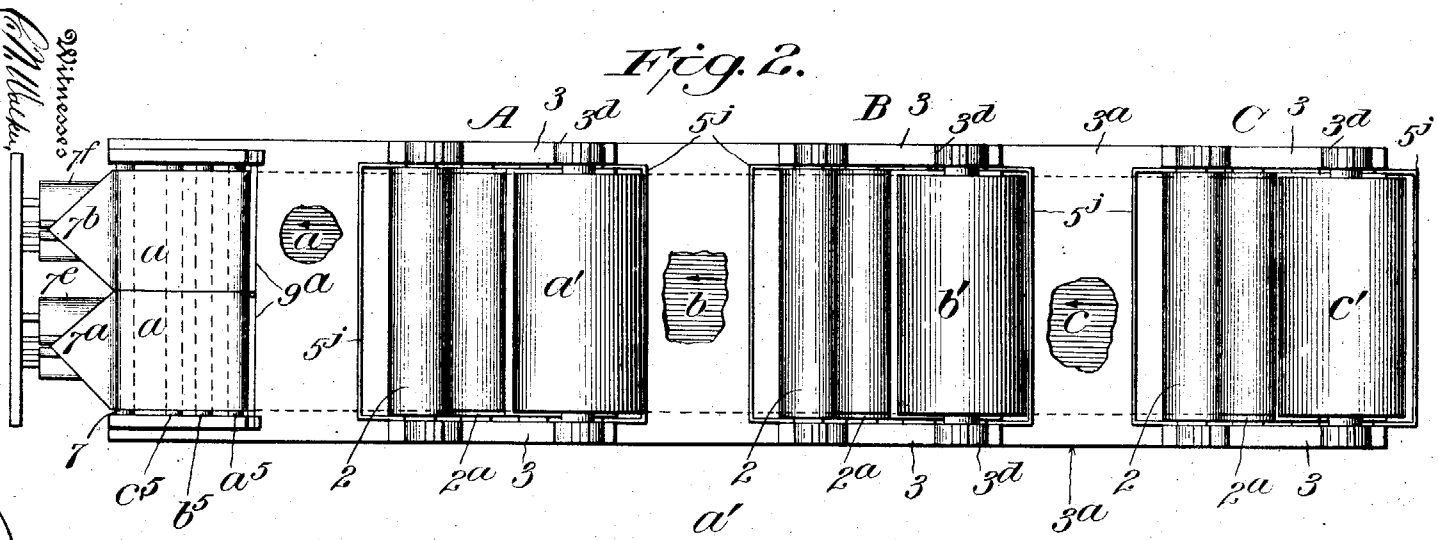
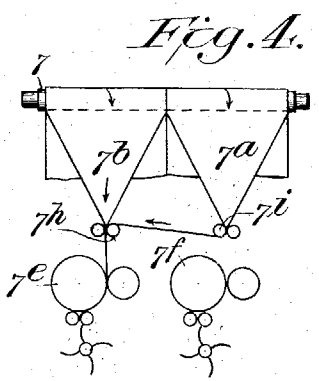
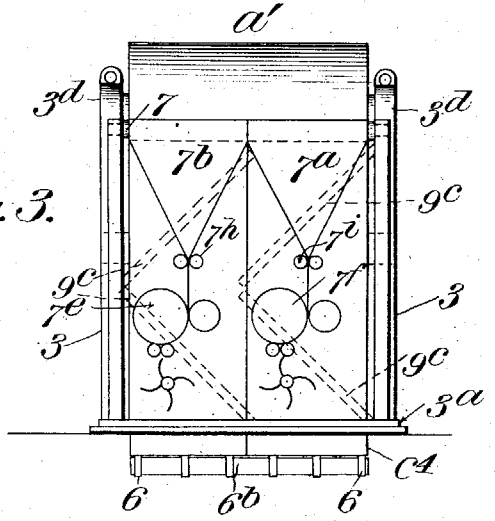
Witnesses
C. M. Walker,
James R. Mansfield
Inventor
Henry F. Bechman.
By:
Alexander & Dowell
Attorneys

UNITED STATES PATENT OFFICE.

HENRY F. BECHMAN, OF BATTLE CREEK, MICHIGAN, ASSIGNOR TO DUPLEX PRINTING PRESS COMPANY, OF BATTLE CREEK, MICHIGAN, A CORPORATION OF MICHIGAN.

ROTARY PRINTING-PRESS.

13,641. Specification of Reissued Letters Patent. Reissued Nov. 11, 1913.

Original No. 1,054,493, dated February 25, 1913, Serial No. 587,278. Application for reissue filed October 13, 1913. Serial No. 794,982.

*To all whom it may concern:*

Be it known that I, HENRY F. BECHMAN, of Battle Creek, in the county of Calhoun and State of Michigan, have invented certain new and useful Improvements in Rotary Printing-Presses; and I hereby declare that the following is a full, clear, and exact description thereof, reference being had to the accompanying drawings, which form part of this specification.

This invention relates to web printing presses, particularly designed for use in producing newspapers of very large size, and especially relates to the type of presses shown in my Patents No. 814,510 of March 6, 1906, and No. 880,960 of March 3, 1908, wherein the printing and impression cylinders are arranged in substantially the same plane with the plate cylinders outermost so as to permit the cylinders to be readily plated from the sides by pressmen standing upon the floor, and the impression cylinders can also be packed or "made-ready" by the pressman standing on the side of the press. The inking mechanism is also arranged beneath the plate cylinders at convenient access for the pressman.

In large newspaper offices where there is great variation in the size of papers in different editions and large numbers of papers have to be printed a great many presses are used and floor space becomes a matter of prime importance.

The objects of my invention are to economize floor space, and enable a larger number of presses to be used within a given space, and all their products assembled if desired at the same folder or folders so that the products of any one or more of said presses can be assembled and folded together, and at the same time to place the web rolls within easy access of the pressman; and to avoid the necessity of leading any web or webs between or over the presses when they might interfere with free access thereto by the pressman; also to avoid the need of any over head web guides above the presses; to simplify the threading of the presses and the leads of the webs and to facilitate their assemblage, so that by this invention upon a given floor space I can arrange a larger number of such presses and webs than it has heretofore been possible, even with the compact and simple arrangement of presses shown in my said patents.

The invention in brief consists in arranging a plurality of my printing mechanisms side by side upon a common base; with the cylinders in all the several mechanisms parallel, and preferably in the same plane; the mechanisms being sufficiently separated to allow the pressman to work between sets of perfecting mechanisms so as to conveniently plate the same while standing at the side thereof, and so that he can readily observe and adjust the several inking mechanisms; and regulate the tensions of the several webs; at one end of this group of printing mechanisms I arrange the folding mechanism with the folding cylinders preferably at right angles to the printing cylinders; the webs are led from above to and through the respective printing mechanisms and beneath the same, and then over suitable guides under the printing mechanisms to a point between the printing mechanisms and the folding mechanism; then the webs are directed up over suitable guides to the folding mechanism. The webs are all parallel and each runs in a straight line without lateral deflection, from the web roll to the end of the machine (and thence to the folder). If very wide webs are employed the webs may be slitted between the printing mechanisms and the folding mechanism—(the side by side rotary folders being preferably used)—and for large papers one half of each web can be diverted over suitable angle bars into parallelism with the other half of the web, and directed therewith into one folder to be folded with other webs similarly directed thereto, if desired. In this way any number of perfecting mechanisms may be arranged parallel upon the frame, and the webs all led from such mechanism down beneath the machine and thence led longitudinally thereof to the folder. The printed webs passing below the printing mechanisms are entirely out of the way of the pressman and cannot interfere with his free access to all the printing cylinders, and the inking mechanisms and web tensioning devices, all of which remain freely accessible and open to the inspection of the pressman.

By using two side by side folders and angle bars, as in my Patent No. 854,142 of May 21, 1907, at one end of the machine, the total product of all the presses can be directed to either folder,—or the product can be divided in any desired manner and the parts sent to different folders.

In the accompanying drawings I have diagrammatically illustrated such a press and will now explain the invention with reference thereto.

In said drawings—Figure 1 is a diagrammatical side elevation of a complete machine partly in section. Fig. 2 is a plan view of Fig. 1. Fig. 3 is an end view thereof. Fig. 4 is a detail view of the folder showing one method of assembling the webs.

In the drawings A, B, C, represent three perfecting mechanisms, each perfecting mechanism comprising plate cylinders 1 and 2, and interposed co-acting impression cylinders $1^a$, $2^a$ which are arranged parallel and preferably in the same plane, said mechanisms being spaced apart so that a pressman can enter therebetween.

Beneath each plate cylinder is an ink distributing drum 5, from which ink is supplied to the superposed plate cylinders by a set of rolls $5^a$ and on which ink is distributed by rolls $5^d$, and to which ink is supplied from a fountain $5^j$ by a ductor $5^g$. The printing and inking mechanisms in each group are preferably constructed substantially as described in my Patent No. 823,098 of June 12, 1906. But in the present machine the plate cylinders are rotated in a direction contrary to that described in my patent because of the reversal of travel of the web through the press, as hereinafter explained; and this reversing of the plate cylinders also causes a reversal of the inking mechanisms, and enables me to place the distributing rolls $5^d$ on the outer side of the drum 5, instead of at the inner side thereof, as in my said patent, so that in the present invention all the inking mechanisms will be directly and easily accessible for inspection at all times, even when the press is in operation; which is a material practical advantage to the pressman.

The several plate cylinders and their inking mechanisms and fountains are supported in standards 3, at the sides of the press, attached to a common base frame $3^a$. The plate and impression cylinders in each set are intergeared as usual, and they all may be driven in unison by means of a train of driving gears $4^b$ in each set mounted on one of the standards and respectively transmitting motion from a train of driven gears $4^a$ mounted upon the base frame $3^a$, and which may be driven from a main drive shaft 4 journaled in the base frame and located at any suitable point. This drive is indicated diagrammatically in Fig. 1, and although I do not consider the invention restricted to this form of drive, it is at present preferred as all the driving is transmitted through spur gears from the main shaft to the several sets of printing and inking mechanisms.

Instead of arranging the web rolls at the side of the printing mechanisms and threading them upwardly therethrough, as shown in my aforesaid patents; in the present invention the web supply rolls $a'$, $b'$, $c'$, are mounted above the respective mechanisms A, B, C, in suitable supports $3^d$ on the standards 3.

The web $a$ is led from roll $a'$ past a guide $a^2$ down between cylinders 1, $1^a$, and up between cylinders $1^a$, $2^a$, and then down between cylinders 2, $2^a$, being printed on one side by forms on cylinder 1 and perfected on the opposite side by the forms on cylinder 2. It is then led down between the printing mechanism to and under a guide $a^3$, and thence forward longitudinally of the press to and over a guide $a^4$, thence up to and over a guide $a^5$, and thence to a roller 7, and thence to the folding cylinders of a folding mechanism at one end of the press. Similarly web $b$ is led over a guide $b^2$ between the plate and impression cylinders in mechanism B, thence down under guide $b^3$, thence longitudinally of the press parallel with the web $a$, to a roller $b^4$, thence up over guide $b^5$ to the roller 7 where it is associated with web $a$ and passes to the folder. Similarly web $c$ is led over guide $c^2$ between the plate and impression cylinders in mechanism C, thence down under guide $c^3$ and thence longitudinally of the press parallel with webs $a$, $b$, to and over a guide $c^4$, up over a guide $c^5$ to roller 7, where it is associated with webs $a$, $b$, and passes therewith to the folder.

In order to prevent sagging of the lengths of printed webs passing beneath the press, supporting tapes 6 running over suitably driven pulleys $6^b$ may be arranged beneath the press as shown in Fig. 1.

Preferably I arrange two rotary folders $7^e$, $7^b$, as shown in my Patent No. 854,142 aforesaid, at one end of the press. These folders may be driven by a train of gearing $4^e$ from a counter-shaft $4^f$, which is driven by bevel gear $4^g$ from a bevel gear $4^h$ on shaft 4, as indicated in the drawings, Fig. 1, so that the folding mechanism will be driven in exact unison with the printing mechanism. Each folder is designed to handle two-page-wide webs, and as the plate cylinders are customarily four-pages long, the wide webs A, B, C, may be divided longitudinally by means of suitably located slitters, as $8^a$, $8^b$, $8^c$, located at convenient points adjacent the folders; and preferably at some point between the guides $a^3$, $b^3$, $c^3$ and the folder. As it is frequently desired when using such wide webs to assemble them on one folder, angle bars may be provided whereby one-half of each split web can be deflected into the path of or opposite the other half of such web, as indicated in Fig. 3. For this purpose sets of deflectors $9^a$, $9^b$, $9^c$, may be arranged at any suitable point, but preferably between the slitters and the roller 7. These deflectors operate to deflect one-half of each of the split webs, as described in my aforesaid patents. With this arrangement if the press is printing four-page wide webs, such webs can be slit, and assembled, and directed into one folder, so that assuming each printing mechanism on the press shown is printing 16 pages, a 48-page paper could be delivered at one folder; or if the webs were simply slit, and their opposite halves sent to separate folders, two 24-page papers could be simultaneously delivered at each operation of the press. With this arrangement of mechanisms one large paper can be delivered at either folder, or two papers of the same, or different, size (up to the total page capacity of the press) can be delivered at each operation of the press. In the drawings an extra web roll is indicated as supported above each printing mechanism, so that when one roll is exhausted the other can be quickly put in use; and while one roll is being used, another roll can be brought into position for use. The height of the center of each paper roll above the floor is about that of an ordinary pressman who can easily regulate the tension on the roll while standing on the floor, which is a great advantage of the press. Another important advantage is that the webs always pass down when the press is running. After leaving the paper roll each web goes into the printing mechanism and thence runs down onto the tape supports, which carry it to the folder. And when run in this manner if any web should tear or break it will not hang back as it would do in case it was running upwardly, but it will be brought forward to where the pressman can easily get at it. In my press there is no web or webs running down outside of or beside any of the printing mechanisms in a way to obscure or interfere with the pressman's free inspection and manipulation of any parts of the printing mechanisms or inking mechanisms while the press is running; each web roll tension is under direct control of the pressman from the floor, and all the fountains, plates and packing, can be easily inspected from the floor. Alley-ways are left for the pressman between the sets of printing mechanisms, so that all the plate cylinders can be plated from the floor, and the pressman does not have to climb over or into any part of the press in order to plate the cylinders, or to pack the impression cylinders; or to adjust the inking mechanisms, or the tension of any web.

Any section of the press can be thrown out of operation by slipping one of the gears in its train of gears $4^b$ out of mesh, so that when printing small papers it is not necessary to run the entire machine, and one or more sections of the machine can be operated while other sections are being made ready.

Instead of assembling all the webs as above described and leading them to one folder so that they shall all be folded and delivered in one large book-fold section by such folder—the webs can be divided into two sections as above described, and the sections led separately to the respective formers $7^a$, $7^b$; and then the section of web led over one former can be diverted from the rollers at the point thereof and led over to the rollers at the point of the other former and there associated with the web coming from the latter, so that the webs will be associated before going in the folding rolls, but will be folded in two sections, instead of in one book-fold. Thus, as indicated in Fig. 4, the section of web led over the former $7^a$, instead of going into the folding rolls $7^f$, is diverted under the roller $7^d$ at the apex of former $7^a$ and led over to the roller $7^h$ at the apex of the former $7^b$, and thence passed,—with the sections of web coming over the former $7^b$,—to the folding rolls $7^e$. Of course the sections of web coming over former $7^b$ could if desired be similarly diverted to the folder $7^f$ and assembled with the web coming over the former $7^a$.

While I prefer to arrange a web roll above each perfecting mechanism, as indicated in the drawings, I do not wish to be restricted to such particular location of the web supply rolls; as where there is plenty of press room the web supply rolls might be located in any other convenient position, and webs led therefrom to the guides $a^2$, $b^2$, $c^2$ of their respective printing mechanisms.

What I claim is:

1. In combination, a plurality of parallel perfecting mechanisms arranged side by side but spaced apart so that the operator may pass between adjacent perfecting mechanisms, the plate and impression cylinders in each perfecting mechanism being arranged in substantially the same plane with the plate cylinders outermost; a web roll supported above each perfecting mechanism, and guides for directing a web from each roll downwardly through the adjacent perfecting mechanism; with a pair of folding mechanisms at one end of the machine, guides whereby the printed webs may be directed beneath said printing mechanism to said folding mechanisms, tapes supporting the webs passing below the perfecting mechanisms to the folder; means for slitting the webs, and means whereby the slit webs may be directed to one, or both, of the folding mechanisms.

2. In combination, a plurality of parallel perfecting mechanisms arranged side by side but spaced apart so that the operator may pass between adjacent perfecting mechanisms, the plate and impression cylinders in each perfecting mechanism being arranged in substantially the same plane; a web roll for each perfecting mechanism, and guides for directing a web from each roll downwardly to the related perfecting mechanism; with folding mechanisms, guides whereby the printed webs may be directed beneath said printing mechanisms to said folding mechanisms; means for slitting the webs, and means whereby the slit webs may be directed to the same or different folding mechanisms.

3. In combination, a plurality of parallel perfecting mechanisms arranged side by side but spaced apart so that the operator may pass between adjacent perfecting mechanisms, the plate and impression cylinders in each perfecting mechanism being arranged in substantially the same plane; a web roll for each perfecting mechanism, and guides for directing a web from each roll to and downwardly through the related perfecting mechanism; with a plurality of folding mechanisms, and guides whereby the printed webs may be directed beneath said printing mechanisms to the same folding mechanism or to different folding mechanisms.

4. In combination, a series of parallel perfecting mechanisms arranged side by side but spaced apart so that the operator may pass between adjacent perfecting mechanisms, the plate and impression cylinders in each perfecting mechanism being arranged in substantially the same plane and with the plate cylinders outermost; a web roll supported above each perfecting mechanism, and guides for directing a web from each roll downwardly through the adjacent perfecting mechanism; with a folding mechanism at one end of the machine, guides whereby the printed webs may be directed beneath the series of perfecting mechanisms toward said folding mechanism, and guides for directing the webs upwardly beside and between the folder and the adjacent printing mechanism and then downwardly to the folder, substantially as described.

In testimony that I claim the foregoing as my own, I affix my signature in presence of two witnesses.

HENRY F. BECHMAN.

Witnesses:
F. E. HALL,
ARTHUR E. DOWELL.

Copies of this patent may be obtained for five cents each, by addressing the "Commissioner of Patents, Washington, D. C."